United States Patent [19]

Seto

[11] Patent Number: 5,585,940
[45] Date of Patent: Dec. 17, 1996

[54] FACSIMILE APPARATUS WITH RECORDING DENSITY CONTROL

[75] Inventor: Toshio Seto, Zama, Japan

[73] Assignee: Ricoh Company, Ltd., Tokyo, Japan

[21] Appl. No.: 551,282

[22] Filed: Oct. 31, 1995

Related U.S. Application Data

[63] Continuation of Ser. No. 155,849, Nov. 23, 1993, abandoned.

[30] Foreign Application Priority Data

Nov. 27, 1992 [JP] Japan .................. 4-318657

[51] Int. Cl.⁶ .................................. H04N 1/00
[52] U.S. Cl. .................. 358/438; 358/400; 358/434
[58] Field of Search ........................ 358/400, 401, 358/464, 481, 474, 498, 296, 298, 434, 438; 355/214, 246, 319, 320, 23, 24; 347/3, 131, 252–254; H04N 1/00

[56] References Cited

U.S. PATENT DOCUMENTS

| | | | |
|---|---|---|---|
| 4,814,791 | 3/1989 | Ohara et al. ........................ | 346/108 |
| 4,893,194 | 1/1990 | Sakata ................................ | 358/410 |
| 4,905,098 | 2/1990 | Sakata ................................ | 358/468 |
| 5,041,915 | 8/1991 | Hirota et al. ...................... | 358/400 |
| 5,140,349 | 8/1992 | Abe et al. .......................... | 346/160 |
| 5,142,304 | 8/1992 | Sato et al. . | |
| 5,202,915 | 4/1993 | Nishii . | |
| 5,283,793 | 2/1994 | Shoji . | |
| 5,373,368 | 12/1994 | Taniguro ............................ | 358/438 |

*Primary Examiner*—Kim Vu
*Attorney, Agent, or Firm*—Oblon, Spivak, McClelland, Maier & Neustadt, P.C.

[57] ABSTRACT

In a facsimile apparatus, record density data associated with received data is used to control record density on a paper. At the same time, the emission intensity or pixel-by-pixel emission interval of a light emitting device is controlled to change tonality on a paper pixel by pixel in association with the record density. Hence, even when the record density of received data changes, the present invention prevents the density of a reproduced image from changing and prevents discontinuous lines from being undesirably exaggerated.

7 Claims, 7 Drawing Sheets

FACSIMILE APPARATUS WITH RECORDING DENSITY CONTROL

This application is a continuation of application Ser. No. 08/155,849, filed on Nov. 23, 1993, now abandoned.

BACKGROUND OF THE INVENTION

The present invention relates to a facsimile apparatus having recording means of the type causing a light emitting device to emit light in response to data received from an external channel so as to form a corresponding image on a photoconductive element, and then recording the image on a recording medium.

It is a common practice with a facsimile apparatus to represent record pixel density by a metric system, e.g., 8×3.85 pixels per millimeter or 8×7.7 pixels per millimeter, as prescribed by the CCITT agreement. On the other hand, regarding recording devices, the pixel density is often represented in inches, e.g., 240 dots per inch (dpi)×240 dpi. This brings about a problem that the difference in standard prevents received facsimile data from being transferred to and recorded by a recording device in various manners. To eliminate this problem, the received data may be thinned or interpolated to match the standards. However, the standards cannot be matched unless the difference in pixel density is $2^n$ times. In light of this, Japanese Patent Laid-Open Publication (Kokai) No. 82010/1989 discloses an apparatus which produces clear-cut images by changing the rotation speed of a polygon motor and the frequency of a pixel synchronization signal and, therefore, the record pixel density. In this case, to prevent the overall image density from changing, the size of a record pixel may be changed by a variable restriction generally referred to as an aperture, as also proposed in the past. Further, there has been known a facsimile apparatus operable, in a facsimile mode, to transform multilevel image data generated by a scanner and representative of a document to bilevel image data, compress it, and then transmit it and, in a copy mode, to transfer the multilevel image data directly to a recording section.

Assume that a facsimile apparatus reads thin oblique lines at a density corresponding to the standard recording density of 8×3.85 pixels per millimeter and sends the resulting data to a remote facsimile apparatus. Then, when the receiving apparatus receives and records the data, it is likely that the oblique lines appear partly discontinuous since image data representative of a line thinner than the pixel is sometimes converted to a white pixel in the event of digitization. In light of this, it has been customary with the transmitting apparatus to slightly increase the values of image data read representative of a document or to execute image processing using a spatial filter. However, such a scheme is successful only with a popular apparatus having a relatively large recording dot size. Specifically, in a popular apparatus, when the low line density data mentioned above is received and recorded by a recording device, an acceptable image can be recorded with the defects of the transmitted image corrected. By contrast, when it comes to a recording device whose recording density is as high as 16 lines per millimeter, which is now attracting attention, the pixel size is small to render the entire image faint while discontinuous lines are exaggerated due to high definition.

Today, recycled papers and color papers are increasingly used to save limited natural resources and to enhance color sensation, respectively. When such papers are used to record images, the image density relative to the background density is lowered to render images illegible. Moreover, when these papers are thin and used to record an image on both sides thereof, the image on the rear is apt to interfere with the image on the front due to transmission.

SUMMARY OF THE INVENTION

It is, therefore, an object of the present invention to provide a facsimile apparatus capable of recording clear-cut images and producing legible two-sided copies by preventing the image density from changing in association with received data and preventing discontinuous lines from being exaggerated, without regard to the kind of a paper used.

A facsimile apparatus of the present invention comprises a receiving section for receiving data via an external channel, and a recording section for recording on a recording medium an image represented by the data received by the receiving section. The recording section controls a record density on the recording medium on the basis of record density data of the data to thereby change the density on the recording medium pixel by pixel.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
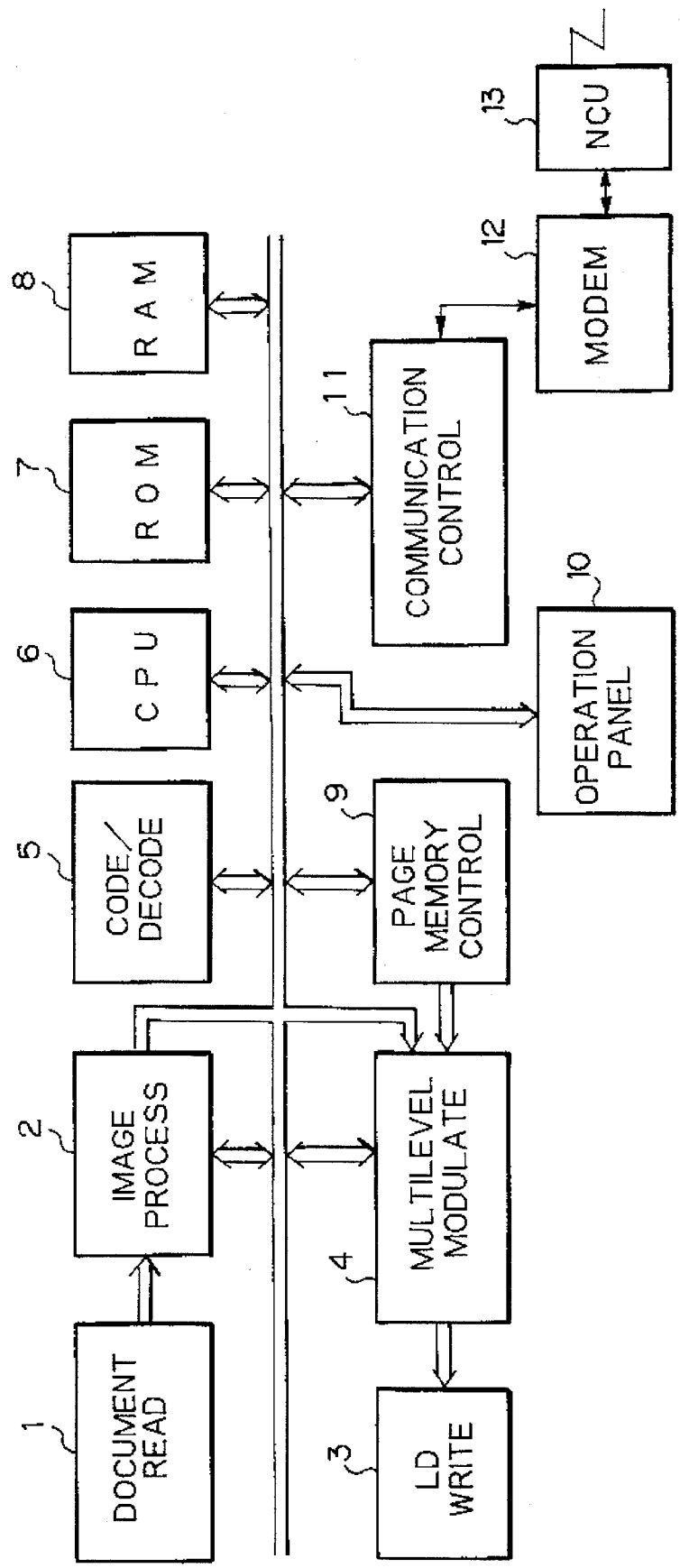
FIG. 1 is a block diagram schematically showing video signal processing circuitry included in a facsimile apparatus embodying the present invention.
Figure 2:
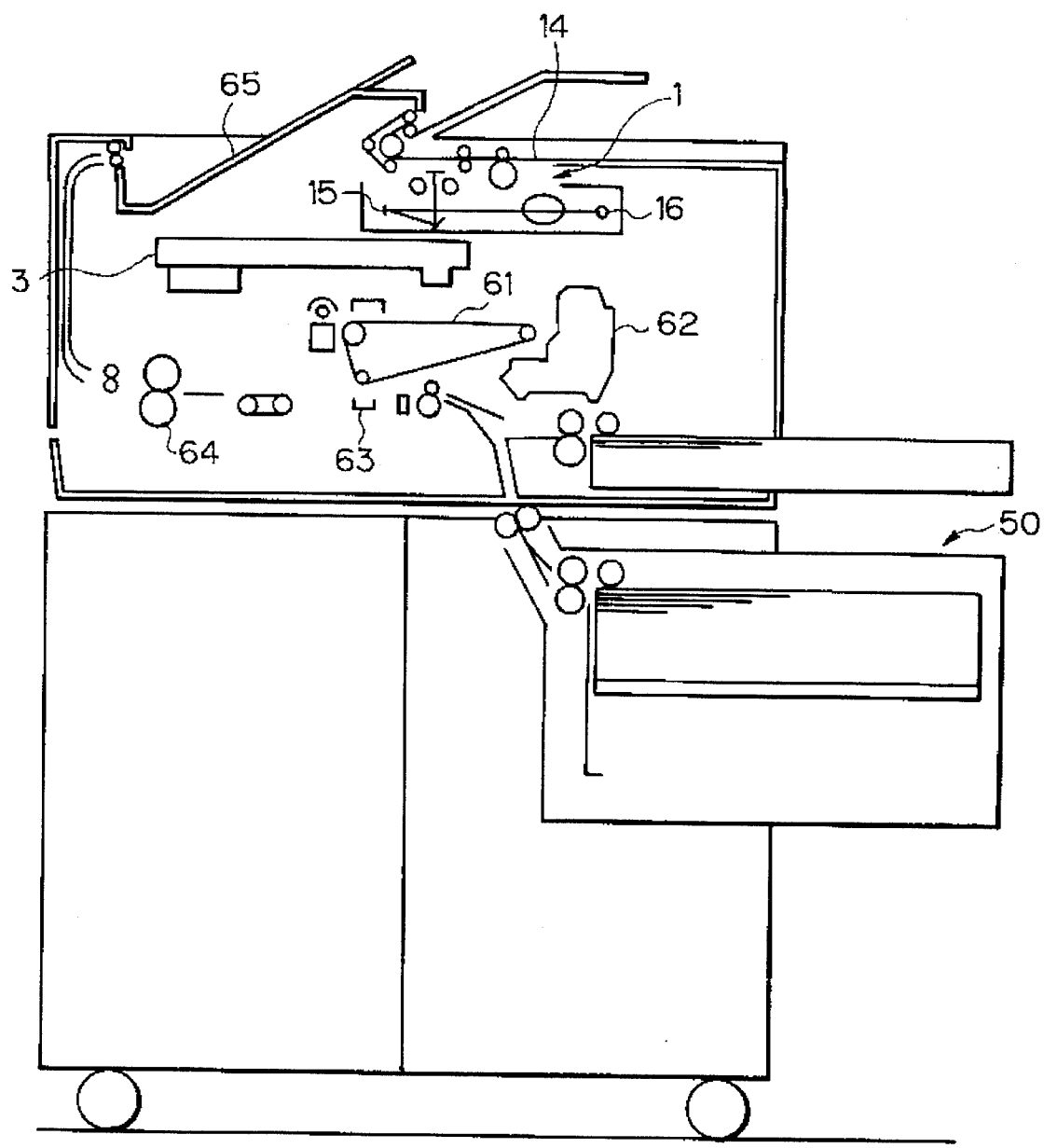
FIG. 2 is a section showing the general mechanical construction of the embodiment.

A facsimile apparatus embodying the present invention and having a laser recording device will be described with reference to FIGS. 1 and 2. As shown, the facsimile apparatus has a document scanning section 1 including a glass platen 14. As the scanning section 1 scans a document laid on the glass platen 14, the resulting imagewise reflection is photoelectrically converted by a CCD (Charge Coupled Device) image sensor 16 included in optics 15, and is then digitized to turn out multilevel video data MVD representative of the consecutive pixels of a scanning line. An image processing section 2 executes various kinds of image processing, e.g., shading correction for correcting optical distortions and MTF (Modulation Transfer Function) correction with the video data MVD. As a result, bilevel video data DVD are produced. When a facsimile mode, as distinguished from a copy mode, is selected on an operation panel 10, the video data DVD are transformed to code data by a coding/decoding section 5. The code data are sent out to an external channel via a modem 12 and an NCU (Network Control Unit) 13 under the control of a communication control section 11. On the other hand, data received via the modem 12 and NCU 13 are decoded to bilevel video data DVD by the coding/decoding section 5. An LD (Laser Diode) writing section 3 includes a laser diode. A multilevel modulating section 4 modulates, under the control of a page memory control section 9, the intensity and pulse width of the laser diode by the video data DVD on the basis of record density data received from the transmitting facsimile apparatus. Specifically, the laser diode emits light intermittently with varying intensity in response to the video data DVD. Consequently, an image represented by the received data is electrostatically formed on a photoconductive element implemented as a belt 61.

On the other hand, when a copy mode is selected on the operation panel 10, the multilevel video data MVD generated by the scanning section 1 and processed by the image processing section 2 are directly applied to the LD writing section 3 via the multilevel modulating section 4. As a result, a copy of the document scanned by the scanning section 1 is produced. Specifically, a latent image formed on the photoconductive belt 61 is converted to a corresponding toner image by a developing unit 62 using a negative-to-positive (N/P) process. A transfer charger 63 transfers the toner image to a recording medium, e.g., a paper fed from a paper feed section 50. When the paper is pressed and conveyed by a fixing roller 64, the toner image is fixed on the paper. Finally, the paper, or copy, is driven out to a tray 65. In FIG. 1, the reference numerals 6, 7 and 8 designate a CPU (Central Processing Unit), a ROM (Read Only Memory), and a RAM (Random Access Memory), respectively.

Figure 3:
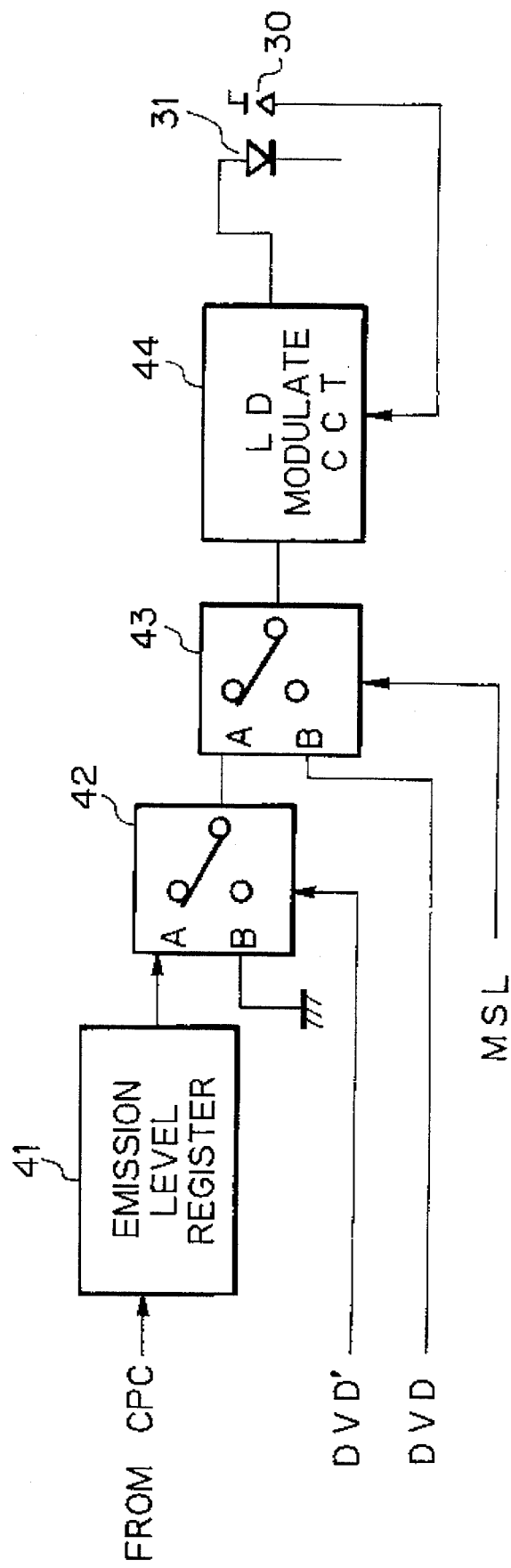
FIG. 3 is a schematic block diagram showing a multilevel modulating section included in the embodiment in detail.

The multilevel modulating section 4 is shown in detail in FIG. 3. When the copy mode is selected, the multilevel video data MVD are transferred from the image processing section 2 to an input terminal B of a switch 43. At the same time, a mode select signal MSL is fed to the switching terminal of the switch 43 to cause it to select the input terminal B, i.e., the video data MVD. The video data MVD from the switch 43 are delivered to an LD modulating circuit 44 to modulate the intensity and pulse width of a laser diode 31. As a result, the laser diode 31 emits a beam intermittently with varying intensity in response to the modulated video data. As a photodetector 30 detects the laser beam, the resulting output of the photodetector 30 is fed back to the LD modulating circuit 44, thereby causing the circuit 44 to output a predetermined modulating signal at all times.

Assume that facsimile data are received from a remote station when the facsimile mode is selected. Then, the switch 43 is so conditioned as to select the output of a switch 42 connected to the other input terminal A thereof. Applied to the switching terminal of the switch 42 are the bilevel video data DVD' decoded by the coding/decoding section 5 on the basis of the received facsimile data. When the video data DVD' is in a low level (white), the switch 42 selects the ground potential connected to an input terminal B thereof; when the video data DVD' is in a high level (black), it selects the output of a register 41 connected to an input terminal A and used to set an emission level. Specifically, the register 41 sets, in response to a command from the CPU 6, multilevel data matching the record density data of the received data and determining the intensity and pulse width of the laser diode 31.

Figure 7:
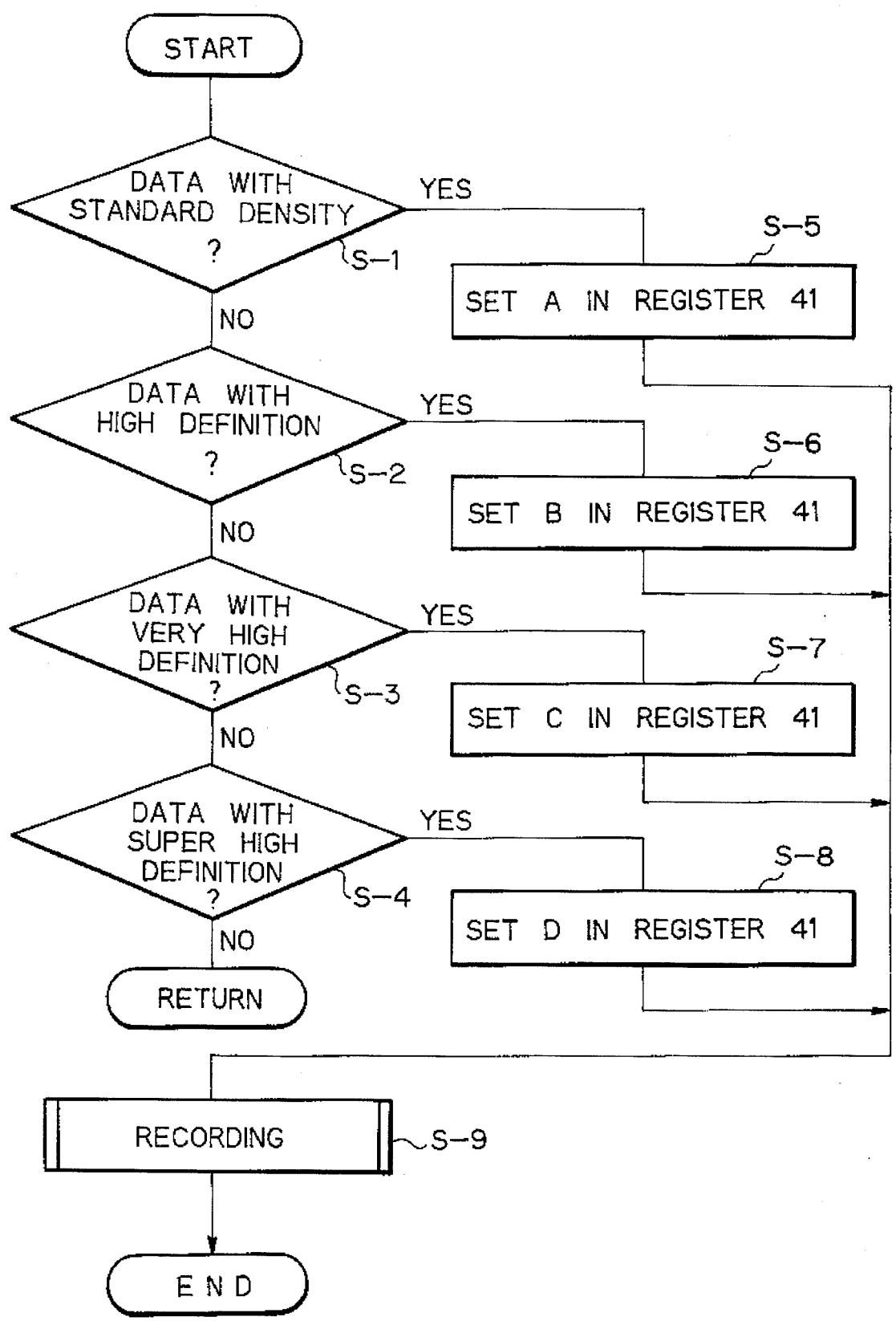
FIG. 7 is a flowchart demonstrating a procedure for setting an emission level in a register particular to the embodiment.

A specific operation of the CPU 6 for controlling the register 41 will be described with reference to FIG. 7. As shown, the CPU 6 determines whether or not the record density data of the received facsimile data is indicative of a standard record density (step S-1). If the answer of the step S-1 is negative, No, the CPU 6 determines whether or not the record density data is indicative of a high definition (step S-2). If the answer of the step S-2 is negative, the CPU 6 determines whether or not the record density data is indicative of a very high definition (step S-3). Further, if the answer of the step S-3 is negative, the CPU 6 determines whether or not the record density data is indicative of an super high definition (step S-4). If the answer of the step S-1 is positive, Yes, the CPU 6 sets a value a in the register 41 (step S-5); if the answer of the step S-2 is positive, it sets a value b in the register 41 (step S-6); if the answer of the step S-3 is positive, it sets a value c in the register 41 (step S-7); and if the answer of the step S-4 is positive, the CPU 6 sets a value d in the register 41 (step S-8) (where a>b>c>d). After any one of the steps S-5 to S-8, the CPU 6 ends the control over the register 41 and starts on a recording procedure.

Figure 4:
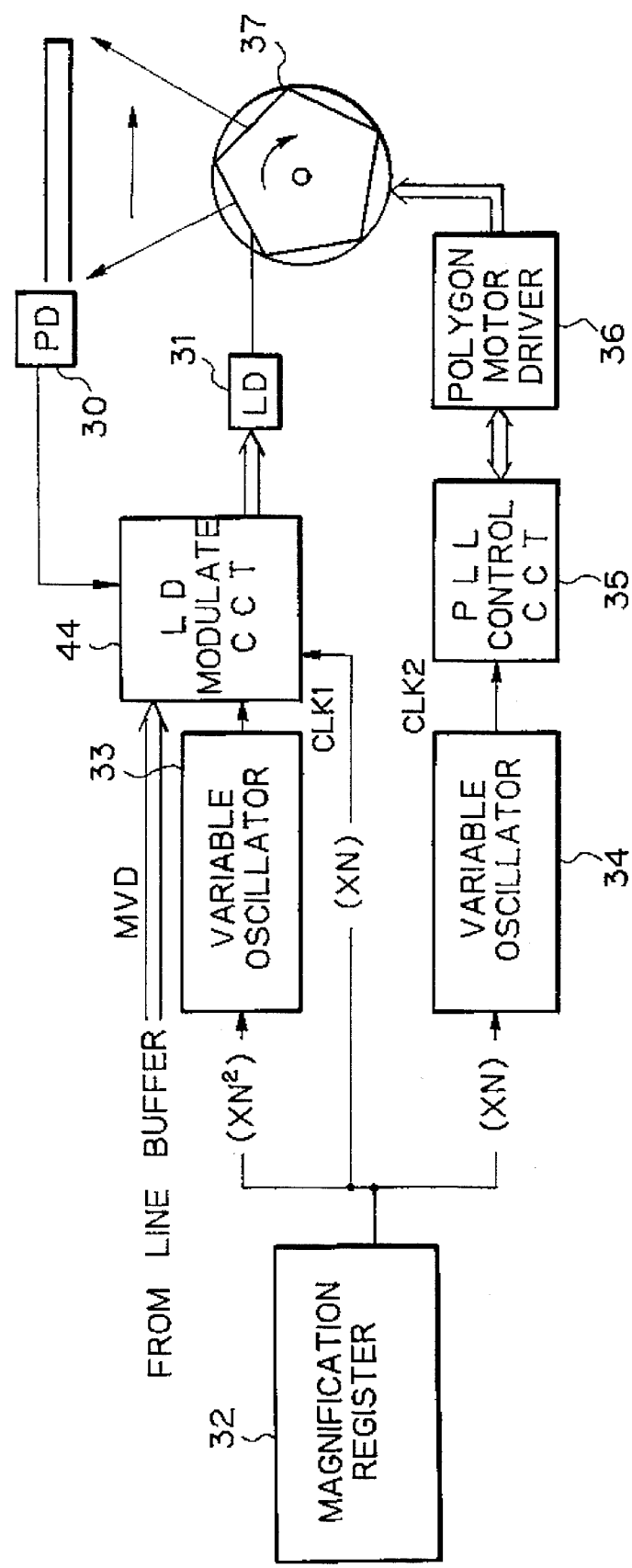
FIG. 4 is a block diagram schematically showing an essential part of a write control circuit included in the embodiment.

FIG. 4 shows an essential part of write control circuitry. How the exposure of the photoconductive belt 61 by the laser diode 31 is controlled will be described with reference to FIG. 4. In the illustrative embodiment, the magnification is variable by N times in both of the main and subscanning directions. The emission period of the laser diode 31 and the rotation speed of a polygon motor, which drives a polygon mirror 37, are controlled in matching relation to the magnification change ratio N. To begin with, when a desired magnification change ratio N is entered on the operation panel 10, it is set in a magnification set register 32. Control signals associated with the magnification change ratio N set in the register 32 are respectively fed to variable oscillators 33 and 34 and the LD modulating circuit 44. In response, the variable oscillators 33 and 34 output respectively a clock CLK1 matching a magnification change ratio $N^2$ and a clock CLK2 matching the ratio N. The clock CLK 1 is used for pixel synchronization while the clock CLK2 is used to drive the polygon motor. The clock CLK 1 is applied to the LD modulating circuit 44 together with the video data MVD. The clock CLK2 is routed through a PLL (Phase Locked Loop) control circuit 35 to a polygon motor driver 36. In response, the driver 36 feeds a current matching the clock CLK 2 to the polygon motor.

Assume that the LD writing section 3 has a record density of 400 dpi, and that data whose record density is 300 dpi are received by way of example. Then, the magnification change ratio N is ¾. In this case, the period of the clock CLK 2 for driving the polygon motor is increased to 4/3 to thereby reduce the rotation speed of the polygon motor to ¾. As a result, a polygon motor line synchronization signal PMSYNC has the period thereof increased to 4/3. On the other hand, the clock CLK for pixel synchronization is reduced in period to $N^2=(¾)^2$.

Figure 5:
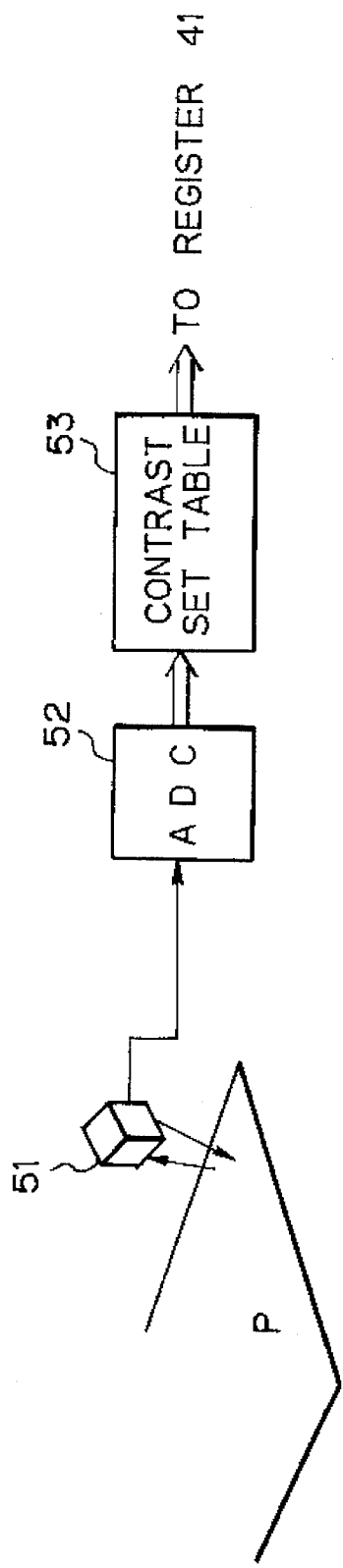
FIG. 5 is a block diagram schematically showing a specific construction of a contrast set signal generating circuit included in the embodiment.

FIG. 5 shows a specific construction of a circuit which generates a signal for setting a record contrast. While a paper P is transported from the paper feed section 50, a reflection type photosensor 51 senses the background density of the paper P. The resulting analog output of the photosensor 51 is transformed to digital data by an analog-to-digital converter (ADC) 52 and is then written to a contrast set table 53. A contrast set signal matching the background density of the paper P is fed from the table 53 to the previously stated register 41. Then, the register 41 is controlled to output intensity/pulse width set data such that the ratio of the maximum image density to the background density of the paper P (S/N ratio) is higher than a predetermined ratio. For example, when the paper P is implemented by a plain paper, the maximum image density is slightly lowered; when it is implemented by a recycled paper or a color paper having high background density, the maximum image density is increased. This is successful in consuming the toner in an adequate amount and in rendering the reproduced image clear-cut.

Figure 8:
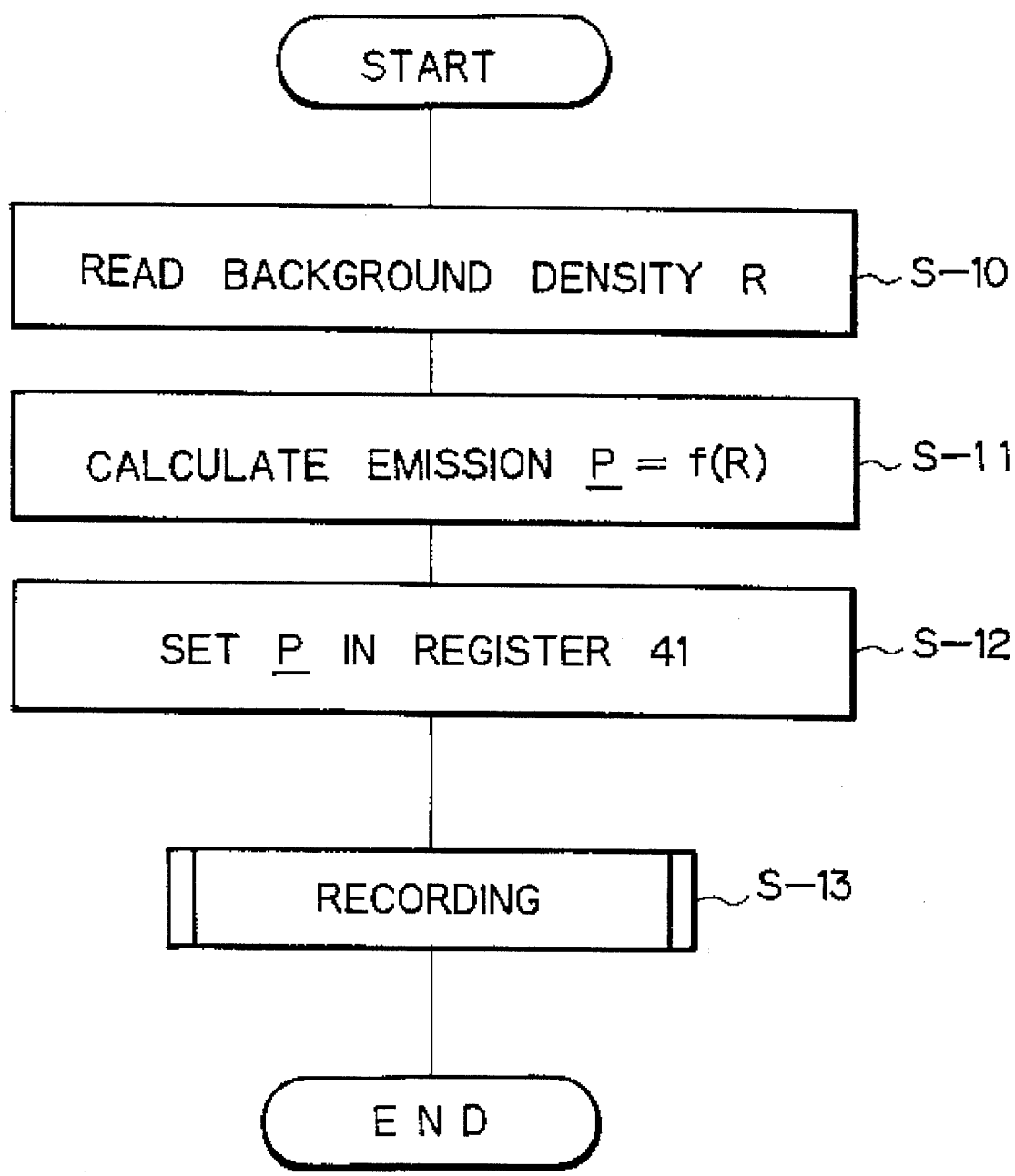
FIG. 8 is a flowchart representative of a procedure for setting a record contrast also particular to the embodiment.

The procedure for setting a record contrast as stated above will be described more specifically with reference to FIG. 8. As shown, the CPU 6 reads the output R of the photosensor 51 representative of the background density of the paper P (step S-10). Then, the CPU 6 references the contrast set table 53 to calculate intensity/pulse width set data p which provides an S/N ratio higher than the predetermined value (step S-11). The calculated data p is set in the register 41 (step S-12). Subsequently, the CPU 6 ends this procedure and starts on a recording operation (step S-13).

Figure 6:
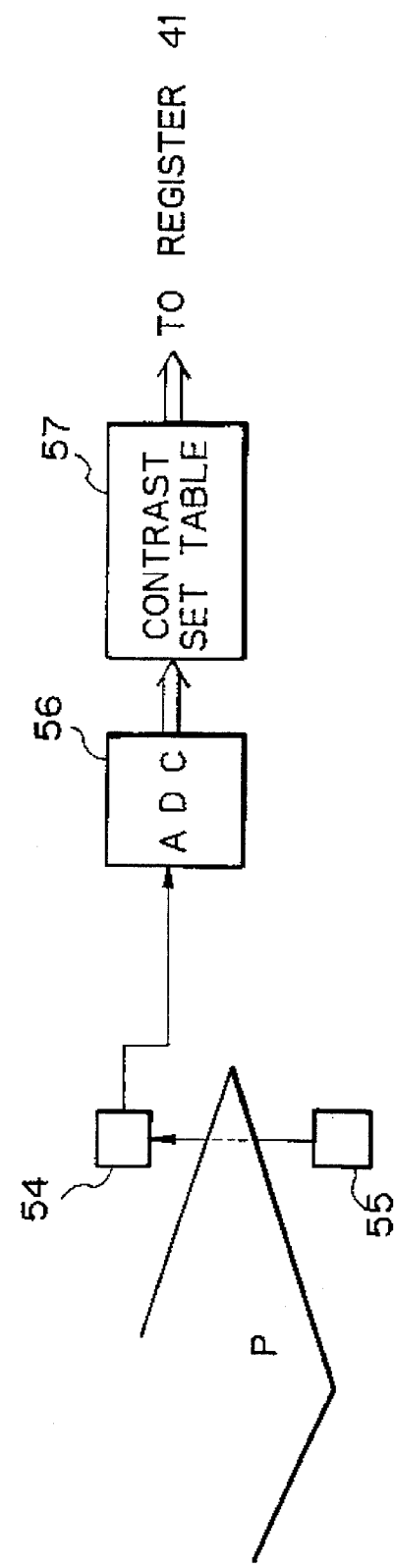
FIG. 6 is a block diagram schematically showing another specific construction of the contrast set signal generating circuit.

FIG. 6 shows another specific construction of the contrast set signal generating circuit. As shown, while the paper P from the paper feed section 50 is in transport, a photosensor 54 receives light from an LED (Light Emitting Diode) via the paper P. The resulting output of the photosensor 54 is converted to digital data by an ADC 56 and is then written to a contrast set table 57. A contrast set signal matching the transmittance of the paper P is fed from the table 57 to the register 41 of the multilevel modulating section 4. In response, the register 41 generates intensity/pulse width set data which reduces the maximum image density to only such a degree that an image formed on the rear of the paper P does not effect an image formed on the front due to transmission.

In summary, in accordance with the present invention, record density data of received data is used to control the record density on a paper. At the same time, the emission intensity or pixel-by-pixel emission interval of a light emitting device is controlled to change tonality on a paper pixel by pixel in association with the record density. Hence, even when the record density of received data changes, the present invention prevents the density of a reproduced image from changing and prevents discontinuous lines from being undesirably exaggerated. As a result, attractive images can be recorded at all times.

Further, the rotation speed of a polygon motor and the frequency of a pixel synchronization signal are changed on the basis of the record density data of received data, thereby controlling the record density on a paper. Therefore, the present invention can deal with record density data of any desired value.

Moreover, the maximum density or tone on a paper is changed pixel by pixel in matching relation to a sensor output representative of the background density of a paper. This provides clear-cut images without regard to the kind of a paper used.

In addition, when a two-sided copy mode is selected, the maximum density on a paper is changed pixel by pixel in response to a sensor output representative of the transmittance of the paper. Hence, clear-cut two-sided copies are achievable without regard to the kind of a paper used.

Various modifications will become possible for those skilled in the art after receiving the teachings of the present disclosure without departing from the scope thereof.

What is claimed is:

1. A facsimile apparatus comprising:

receiving means for receiving facsimile data via an external channel;

detecting means for detecting a record density of the received facsimile data;

a register for storing data of an intensity and a pulse width of an image to be recorded based on the detected record density of the received facsimile data;

recording means for recording on a recording medium the image represented by the data received by said receiving means, said recording means having an intensity and a pulse width of an emission level controlled based on the data stored in the register, to thereby control a tonality on said recording medium.

2. An apparatus as claimed in claim 1, wherein said recording means comprises:

a light emitting device for emitting light on the basis of the data received by said receiving means; and a photoconductive element having a surface thereof scanned by the light issuing from said light emitting device;

said recording means further controlling at least one of an emission intensity and a pixel-by-pixel emission interval of said light emitting device.

3. An apparatus as claimed in claim 1, said recording means further comprises a rotatable polygon motor for steering the light issuing from said light emitting device toward said photoconductive element, said recording means changing a rotation speed of said polygon motor and a frequency of a pixel synchronization signal to thereby control the recording density on the recording medium.

4. A facsimile apparatus comprising:

receiving means for receiving facsimile data via an external channel;

detecting means for detecting a record density of the received facsimile data;

determining means for determining data of an intensity and a pulse width of an image to be recorded based on the detected record density of the received facsimile data;

a register for storing said determined data of the intensity and pulse width of the image to be recorded;

recording means for recording on a recording medium the image represented by the data received by said receiving means, said recording means having an intensity and a pulse width of an emission level controlled based on said determined data stored in the register, to thereby control a tonality on said recording medium.

5. An apparatus as claimed in claim 4, wherein said recording means comprises:

a light emitting device for emitting light based on the facsimile data received by said receiving means; and a photoconductive element having a surface thereof scanned by the light issuing from said light emitting device;

said recording means further controlling at least one of an emission intensity and a pixel-by-pixel emission interval of said light emitting device.

6. An apparatus as claimed in claim 4, wherein said recording means further comprises a rotatable polygon motor for steering the light issuing from said light emitting device toward said photoconductive element, said recording means changing a rotation speed of said polygon motor and a frequency of a pixel synchronization signal to thereby control the recording density on the recording medium.

7. A facsimile apparatus comprising:

receiving means for receiving facsimile data via an external channel;

detecting means for detecting a record density of the received facsimile data;

a register for storing data of an intensity and a pulse width of an image to be recorded based on the detected record density of the received facsimile data;

recording means for recording on a recording medium the image represented by the data received by said receiving means, said recording means having an intensity and a pulse width of an emission level controlled based on the data stored in said register to thereby control a tonality on said recording medium;

a variable oscillator for generating, in accordance with a set magnification change ratio, a first clock for pixel synchronization and a second clock for driving a polygon motor;

a motor drive circuit for feeding a drive current to the polygon motor in response to said second clock; and an LD modulating circuit for controlling a record density on said recording medium based on the record density of the received facsimile data, and for outputting, in response to said first clock and image data, a modulated drive signal for causing an LD to emit with a variable intensity or intermittently.

* * * * *